United States Patent [19]

Harrison

[11] Patent Number: 4,514,356

[45] Date of Patent: Apr. 30, 1985

[54] METHOD OF MOLDING A PLASTIC TOILET SEAT HINGE CONNECTABLE BED PLATE

[76] Inventor: David E. Harrison, Star Rte. Box 315, Columbus, Miss. 39701

[21] Appl. No.: 483,931

[22] Filed: Apr. 8, 1983

Related U.S. Application Data

[62] Division of Ser. No. 418,388, Sep. 15, 1982, Pat. No. 4,391,001.

[51] Int. Cl.³ ........................ B29F 1/022; A47K 13/12

[52] U.S. Cl. .................................... 264/328.12; 4/236; 249/157; 249/162; 425/577

[58] Field of Search ........................... 264/328.12, 243; 425/577; 249/157, 162

[56] References Cited

U.S. PATENT DOCUMENTS

| | | | |
|---|---|---|---|
| 2,890,487 | 6/1959 | Morin | 425/577 X |
| 3,004,291 | 10/1961 | Schad | 264/243 X |
| 3,473,197 | 10/1969 | Wilds et al. | 425/577 |
| 3,543,338 | 12/1970 | Cooper | 425/577 X |
| 3,551,936 | 1/1971 | Kutik et al. | 264/243 X |
| 3,685,933 | 8/1972 | Schneider | 425/577 X |
| 3,816,047 | 6/1974 | Mohler | 425/577 |
| 3,930,780 | 1/1976 | Lovejoy | 425/577 X |
| 4,230,657 | 10/1980 | Haack et al. | 264/243 X |
| 4,315,338 | 2/1982 | Harrison | 4/236 |

*Primary Examiner*—Philip Anderson
*Attorney, Agent, or Firm*—Mason, Fenwick & Lawrence

[57] ABSTRACT

A toilet seat hinge has elongated male connector portions provided with saw-toothed shaped upper and lower surfaces which are inserted in female openings in the rear surface of a soft toilet seat and a soft toilet seat cover. The male connector portions lockingly engage with lock lugs provided in a rigid molded bed plate in the seat and cover to prevent retention so that the hinge is permanently connected to the seat and cover following insertion of the male connector member. Another aspect of the invention resides in a novel molding method in which two movable mold components provide openings extending both vertically and horizontally in a molded item.

1 Claim, 10 Drawing Figures

METHOD OF MOLDING A PLASTIC TOILET SEAT HINGE CONNECTABLE BED PLATE

This is a division of application Ser. No. 418,388 filed Sept. 15, 1982 now U.S. Pat. No. 4,391,001.

BACKGROUND OF THE INVENTION

The present invention is in the field of toilet seats, toilet seat covers, and associated hinge arrangements and is particularly directed to a specific hinge, seat, and cover arrangement and a method of forming same.

Soft toilet seats and soft toilet seat covers have previously been formed with a rigid plastic, pressed wood, fiber-board, or wood composition bed plate over which a foam cushion member is provided with the entire enclosure being covered with a vinyl skin. Soft toilet seats and soft toilet seat covers of the foregoing type have been connected to hinge members which are in turn connected to the toilet bowl at installation. The hinge members have had pivotal portions extending beneath the seat or the seat cover with attachment screws extending through the pivotal portions into the underside of the seat for connection to the rigid bed plate. The foregoing construction has not proven to be universally satisfactory in that the attachment screws sometimes become loose and corroded the provision of the attachment means on the lower side of the seat provides a haven for contamination.

The use of connecting screws for effecting connection of the hinge to the seat and/or cover as has been the case in the past necessarily includes a substantial labor expense for fabrication. Also, the fact that the seat cover is supported at its rear edge by hinge components attached to the bottom of the seat cover with the forward end of the seat cover being supported by the seat causes the seat cover to tend to bend when a person sits on it. The cover will consequently sometimes eventually become permanently bowed.

Therefore, it is a primary object of the present invention to provide a new and improved means for effecting the connection between hinge means and toilet seats and toilet seat covers.

A further object of the invention is the provision of a new and improved toilet seat, toilet seat cover, and hinge combination requiring minimal labor for fabrication.

Yet another object of the present invention is the provision of an improved hinge means and soft toilet seat and soft toilet seat cover combination.

A further object of the invention is a new and improved method of molding rigid plastic items.

SUMMARY OF THE INVENTION

The present invention, in its preferred embodiments, comprises a soft toilet seat having a rigid, injection molded, plastic bed plate extending about its lower portions and defining its peripheral outline with the rear edge of the bed plate having two female openings facing rearwardly for receiving elongated male connector members provided on hinge means attachable to a toilet seat bowl. The male connector members each comprise a series of saw-toothed shaped elements facing upwardly and downwardly for engagement with upper and lower lock lugs respectively provided in the bed plate along the upper and lower dimensions of the female mounting opening to be lockingly engaged with the male connector element upon insertion thereof into the opening. The toilet seat is provided with a foam pad overlying the bed plate with the entire assembly being enclosed within a vinyl skin which is open only at the area of each female connector opening.

A toilet seat cover is similarly provided with a bed plate, foam pad, female connector openings, and vinyl skin and is connected to associated elongated male connector members provided on the hinge in the same manner as is the seat component. Thus, insertion of the male connector members into the female openings of both the seat and cover is easily effected with a minimum of labor; however, the connector elements cannot be removed following insertion due to the locking engagement of the saw-toothed surfaces of the male connector member with the lock lugs of the female connector component provided in the plastic bed plate.

Another aspect of the present invention resides in the molding procedure for providing the female opening in the bed plate extending between upper and lower lock lugs. This procedure involves the use of upper and lower mold components which are vertically separable with the upper mold component having a series of equidistantly spaced downwardly facing lug teeth and the lower mold member similarly having a series of upwardly facing mold teeth. When the mold components are moved together, the mold teeth interleave with each other so that their interleaved portions define the dimensions and extent of the horizontal female connector opening of the bed plate being molded. Molten plastic is injected between the mold components and the bed plate is consequently formed. The mold components are then separated vertically to completely clear the bed plate. Consequently, only two mold components movable in vertical directions are employed for providing both openings extending vertically and horizontally in the finished item.

A better understanding of the nature and fabrication of the preferred embodiments of the invention will be achieved when the following detailed description is considered in conjunction with the appended drawings in which like reference numerals are used for the same parts in the different figures.

DESCRIPTION OF THE PREFERRED EMBODIMENT

Figure 1:
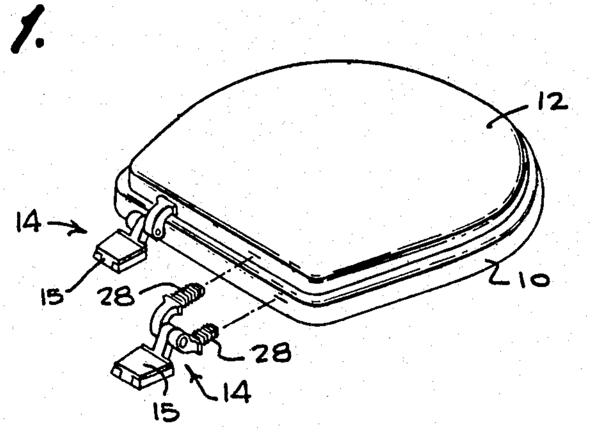
FIG. 1 is a perspective view of the combination of a toilet seat and cover connected by a hinge embodying the invention.
Figure 5:
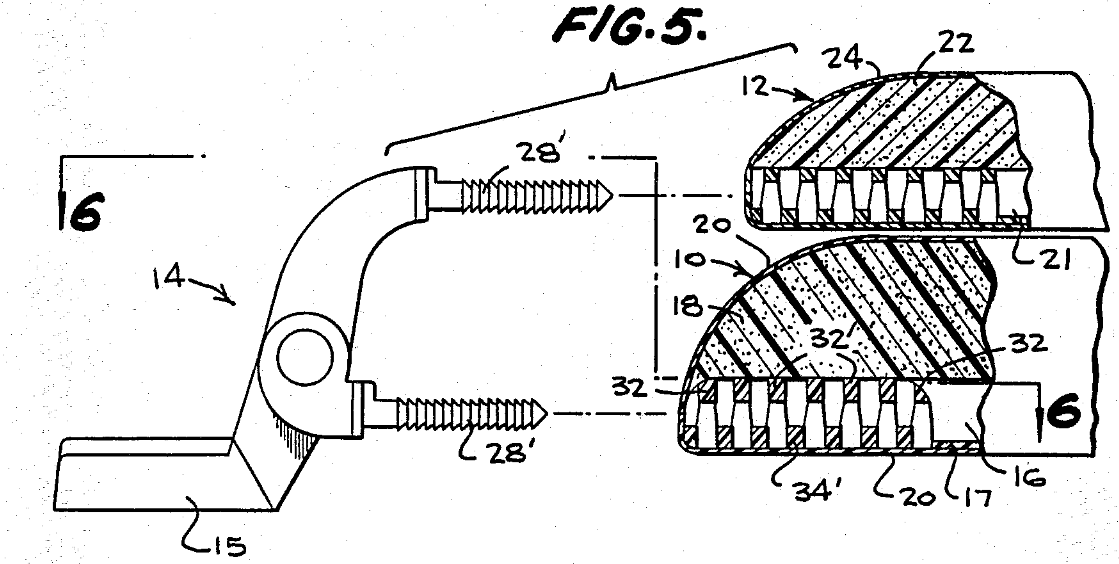
FIG. 5 is a side elevation view of a second hinge component embodiment associated in conjunction with partially sectioned seat and cover members illustrating the mode of connection thereto.

The preferred embodiment of the invention as illustrated in FIG. 1 consists of a soft toilet seat 10, a soft toilet seat cover 12 and associated hinge members 14 having base portions 15 mounted on the rear of a toilet bowl when installed. Toilet seat 10 includes a rigid molded plastic bed plate 16 which includes a floor wall 17 and is formed of polystyrene or polypropylene or other suitable material which provides structural strength and rigidity for the seat and over which a foam cushion or pad 18 is provided. A protective vinyl covering 20 covers the foam cushion or pad 18 and also extends over the periphery and bottom surface of the bed plate 16 as shown in FIG. 5.

Figure 2:
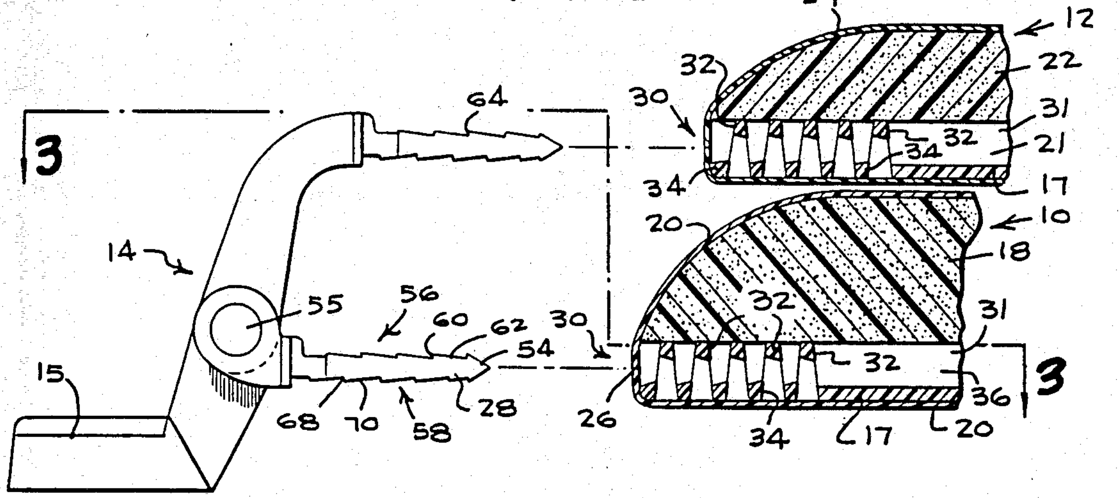
FIG. 2 is a side elevation view of a toilet seat and cover as associated with a first hinge embodiment prior to connection of same with the seat and cover being shown in section.

The toilet seat cover 12 is similarly provided with a bed plate 21 which provides strength and rigidity, a foam cushion or pad 22, and a vinyl covering 24. The vinyl cover 24 covers the cushion or pad 22 and the bed plate 21 in the same manner that the vinyl covering 20 covers the element 18 and 16 of the seat component. The rear portion of bed plate 16 is provided with a pair of apertures or chambers 26 for receiving a male connector spike 28 of hinge members 14. The male connector spike 28 is movable into a female coupling portion of the bed plate 16 where it is permanently retained in a manner to be discussed. The apertures 26 are initially covered at the rearmost portions by a portion of vinyl covering 20 as shown in FIG. 2 which will be slit by insertion of connector spike 28 into aperture 26 so that the edges of the vinyl will serve as a gasket seal around the connector spike as shown at FIG. 4.

The female coupling means is generally designated 30 and is unitarily formed in the rigid molded plastic bed plate 16 of the seat. The female coupling means of the seat component comprises a series of horizontally aligned upper lock lug 32 extending transversely of the seat and a series of lower lock lug 34 also oriented in a horizontal plane and extending transversely of the seat member. It should be noted at this juncture that the terms "horizontal", "above", "below", and the like as used herein refer to the orientation and positioning of the components as shown in the drawing and are indicative of the relative positioning of the components for all positions of orientation. The bottom lugs 34 are positioned out of vertical alignment with respect to the upper lock lugs 32 and are bisected by a vertical plane bisecting the space between adjacent ones of the upper lock lugs 32 as will be apparent from inspection of FIG. 4. The upper lock lugs 32 extend transversely with respect to the seat in a horizontal manner at an elevation above the elevation of the lower portion of the bed plate 16 which consists of planar floor wall 17 which provides the flat bottom surface of the bed plate over which the lower portion of the vinyl covering 20 extends and from which outwardly extending strength imparting ribs 19, 31, etc. extend with the upper surfaces of the strength imparting ribs 19 being coplanar with the upper surfaces of the upper lock lugs 32. It should be observed that the space 36 immediately to the rear of the lock lugs 32 and 34 is devoid of the strength imparting ribs 19 and is open as shown in FIG. 4 for a purpose to be discussed hereinafter.

Figure 3:
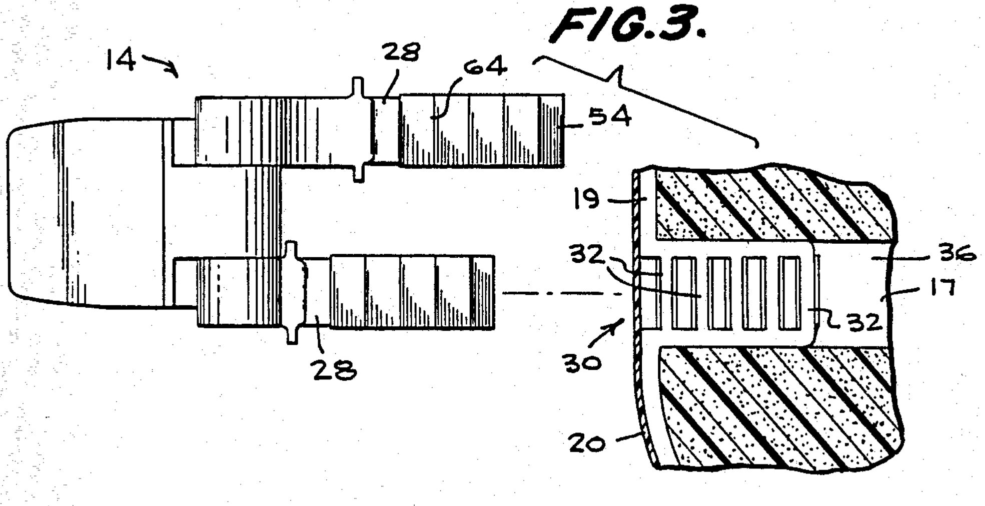
FIG. 3 is a sectional view taken along lines 3—3 of FIG. 2.
Figure 4:
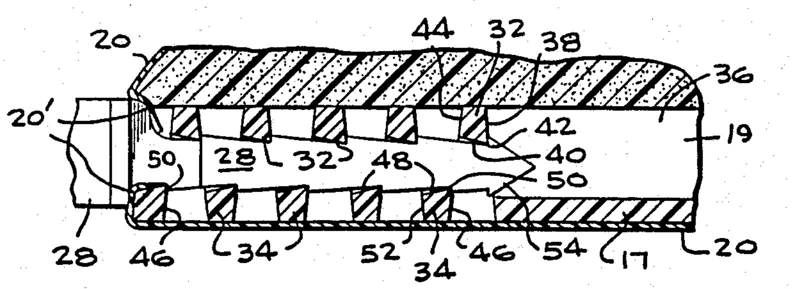
FIG. 4 is a sectional view of the seat component and the associated hinge male coupling connector portion showing the parts in connected relationship.

Each of the upper lock lugs 32 includes an inward lug surface 38 which faces inwardly with respect to the seat and a downwardly facing lower lug surface 40 intersecting said inward lug surface 38 to define a horizontally extending lock corner 42 as shown in FIG. 4. Additionally, each of the upper lock lugs 32 includes a rear lug surface 44 which intersects the rear edge of the downwardly facing lug surface 40. It should be observed that the rear lug surface 44 slopes rearwardly from top to bottom, the downwardly facing lug surface 40 slopes downwardly from rear to front (the term "rear" referring to the rear portion of the seat consisting of the left portion as viewed in FIGS. 3 and 4 and being the end of the seat into which the hinge components are mounted as is discussed hereinafter). Similarly, the inwardly facing or front lug surface 38 slopes rearwardly from bottom to top as shown in FIG. 4.

The lower lock lugs 34 are inverted versions of the upper lock lugs 32. More specifically, the lower lock lugs 34 each include a lower lug inward surface 46 which slopes rearwardly from bottom to top and is parallel to the rear lug surface 44 of the upper lock lugs 32. Also, the lower lock lugs 34 include upper lug surfaces 48 which slope outwardly form rear to front and which intersect the lower lug inward surfaces 46 to define horizontally extending lower lock corners 50. Lastly, the lower lock lugs 34 also include a lower lug rearward surface 52 which slopes rearwardly from bottom to top an has its upper end defined by an intersection with the outwardly facing upper lug surface 48.

The bed plate 21 of the toilet seat cover 12 is similarly provided with a female coupling component 30 having upper and lower lock lugs 32 and 34 basically identical to the upper and lower lock lugs of the seat bed plate 16, and the upper male connector spike 28 is fitted therein in precisely the same manner as the lower male connector spike 28 is fitted in the female coupling portion of the lower bed plate 16 of the seat component.

The connector spikes 28 provided on the hinge members 14 are mounted for pivotal movement about a pintle axis 55 with each spike including a pointed end portion 54 and an upper saw-tooth surface 56 and a lower saw-tooth surface 58 shaped so as to be insertable in the female coupling component 30 by axial movement inwardly therein. The upper saw-tooth surface is defined by rearwardly facing vertical surfaces 60 and rear to front downwardly inclined upper surfaces 62 which intersect to define lock corners 64 into which the lock corners 42 of the upper lock lugs 32 are received for retaining the male connector spike in mounted position as shown in FIG. 4. Similarly, the lower saw-tooth surface 58 includes rearwardly facing vertical surfaces 68 and front to rear downwardly sloping downwardly facing surfaces 70 which similarly intersect to define a corner into which the lock corners 50 of the lower lock lugs 34 are positioned upon insertion of the male connector spike 28 in the female coupling 30 of the seat component.

Figure 6:
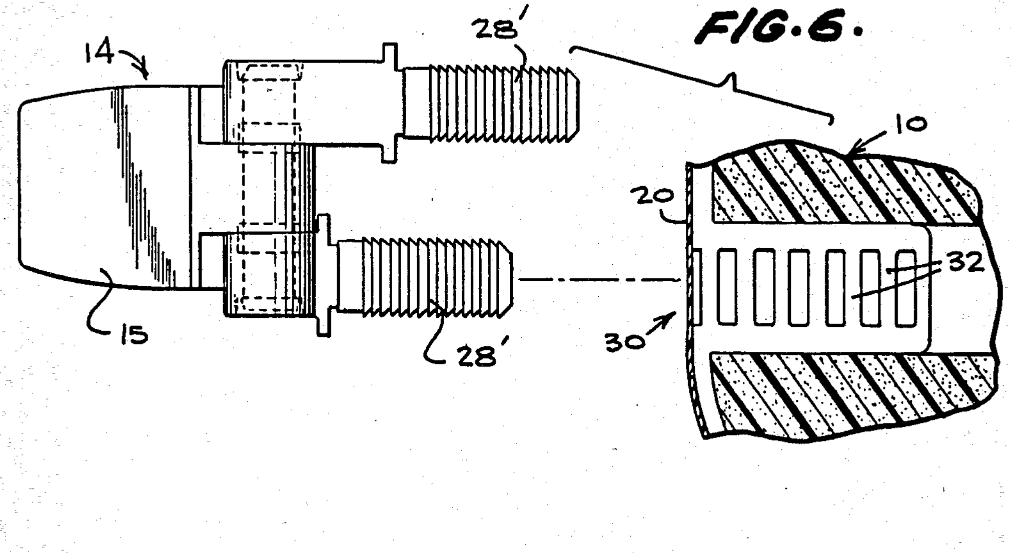
FIG. 6 is a sectional view taken along lines 6—6 of FIG. 5.
Figure 7:
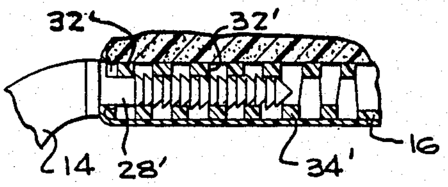
FIG. 7 is a sectional view of the seat component of FIG. 5 illustrating the connection thereto of the hinge component.

FIGS. 5, 6, and 7 illustrate an alternative embodiment in which male connector spikes 28′ having saw-tooth surfaces defined by a larger number of vertical and canted surfaces which extend over the sides as well as the top and bottom of the spikes are employed. Also, the embodiments of these figures employ bed plates having upper lock lugs 32' and lower lock lugs 34' which are of square or rectangular cross-section and are not canted in the manner of the preferred embodiment of FIGS. 1–4 inclusive. The larger number of teeth provided in the saw-tooth surfaces of the male connector spikes 28' permits these spikes to be more easily connected to seat and cover components having dimensional variations in the spacing between the upper and lower lock lugs focused with respect to vertical and horizontal spacing. Also, the square or rectangular lock lug configurations can be formed from mold members requiring less machining than would be necessary for the mold members providing the lock lug having canted surfaces such as shown in FIG. 4.

In both embodiments, the fact that the spike enters the rear surface of the cover permits the cover to rest flatly on the seat when closed (a slight separation of the top of the seat from the bottom of the cover is shown in the drawings for clarity of illustration).

Figure 8:
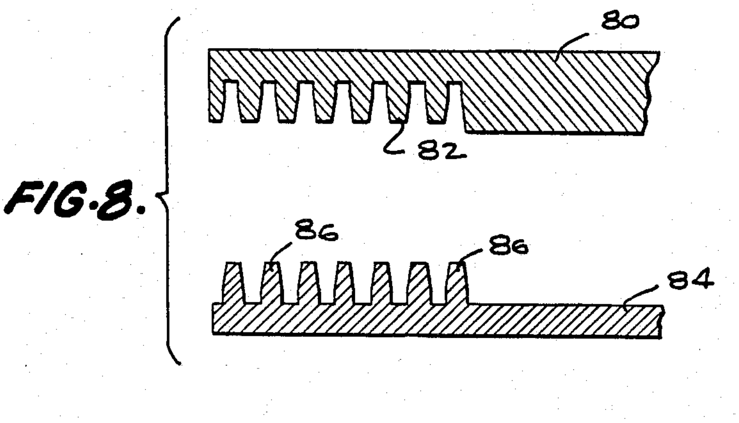
FIG. 8 is a bisecting sectional view illustrating vertically separable mold components employed in formation of the portions of the seat and cover members into which the hinge components are connected.
Figure 9:
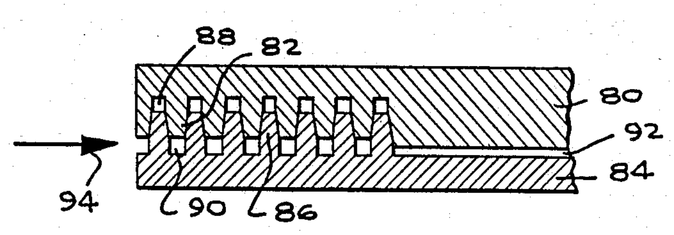
FIG. 9 is a bisecting sectional view of the mold components of FIG. 8 illustrating the positioning of the components during an injection molding operation for forming the reinforcing member of the seat component.
Figure 10:
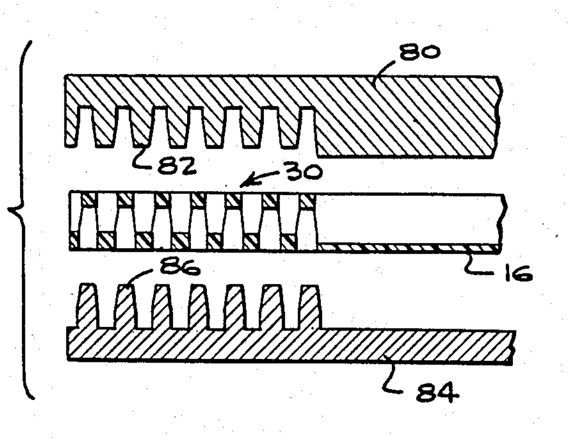
FIG. 10 is a bisecting sectional view similar to FIG. 9 but illustrating the mold components in separated condition following completion of a molding operation and also illustrating a portion of the completed molded reinforcing member produced in the molding operation.

FIGS. 8, 9, and 10 illustrate the unique manner in which the bed plate components 16 and 21 are uniquely formed by injection molding. More specifically, an upper mold half 80 having downwardly facing rib teeth 82 is positioned above a lower mold half 84 having upwardly facing rib teeth 86. The mold halves 80 and 84 are movable toward each other into the position of FIG. 9 so that the rib teeth 82 and 86 are interleaved as shown with transversely extending openings 88 being provided above the upper surfaces of the lower rib teeth 86 and similar transversely extending openings 90 being provided beneath the lower end surface of the downwardly facing rib teeth 82. A horizontal open space 92 is also provided between the mold halves 80 and 82 which also include other mold components for forming the strength imparting ribs and other constituents of the bed plates 16 (or 21). When the mold halves 80 and 82 are positioned as shown in FIG. 9, hot plastic is injected between the mold halves as symbolically illustrated by the arrow 94 so as to completely fill the spaces withing the mold halves. The plastic filling the transverse openings 88 consequently forms the upper lock lugs 32 or 32', the plastic entering the lower transverse openings 90 consequently forms the lower lock lugs 34 or 34'. The liquid plastic entering the horizontal open space 92 forms the floor wall 17 and all of the support ribs. The rear to front opening provided in the female coupling portion 30 is resultant from the interleaving of the rib teeth 82 and 86. Thus, a horizontal front to rear extending opening is provided by mold members that are movable perpendicularly thereto in the vertical direction so as to effectively achieve an economy of fabrication which would not be possible in any other manner without the use of expensive additional movable mold components or by machining procedures.

Another significant aspect of the various embodiments of the present invention is the fact that the male connector spikes can be removed from the bed plate components so as to permit the salvaging of the bed late components 16 or 21. Such removal is effected by cutting off the spikes adjacent their rearmost end and engaging the forward pointed end portion 54 with a tool such as pliers or the like and pulling the male connector spike forwardly into the open space 36 from which it can be easily removed from the bed plate.

It will consequently be seen that the present invention presents a new and uniquely easy to achieve, yet reliable and economical construction for permitting connection between toilet seat hinges and their associated seats and covers. No great skill is required for effecting the connection. However, the connection is permanent, strong, and long lasting.

While numerous modification of the disclosed embodiments will undoubtedly occur to those of skill in the art, it should be understood that the spirit and scope of the invention is to be limited solely by the appended claims.

I claim:

1. A method of molding a plastic toilet seat bed plate having a horizontally extending rectangular opening positioned between upper and lower parallel horizontal rib members of quadrilateral cross-section extending between side wall components, said method comprising the steps of:

providing an upper mold member having a plurality of upper elongated horizontal downwardly facing parallel spaced rib teeth between which a plurality of linear upper grooves extend in parallel horizontal alignment with each other;

providing a lower mold member beneath said upper mold member having a plurality of elongated horizontal parallel equidistantly spaced upwardly facing spaced rib teeth between which a plurality linear lower grooves extend in parallel horizontal alignment with each other, said linear lower grooves being individually in vertical alignment with one of said downwardly facing parallel spaced rib teeth;

effecting relative vertical movement of said upper and lower mold members toward each other so that said upwardly facing spaced rib teeth are individually partially received in respective ones of said upper grooves and said downwardly facing parallel spaced rib teeth are individually partially received in said lower grooves so that the upwardly facing teeth and the downwardly facing teeth are interleaved over a portion of their vertical length with the space occupied by the interleaved portions of the rib teeth being coextensive with the rectangular shape of the horizontally extending opening to be formed and the space in the lower end of said lower grooves not occupied by the upper rib teeth and the upper ends of said upper grooves not occupied by the lower rib teeth being respectively identical in cross-section to said upper and lower horizontal rib members;

injecting molten plastic between said mold members to fill all open spaces between said mold members to provide a body of plastic having the required shape of the toilet seat bed plate;

permitting said molten plastic to solidify;

effecting relative vertical movement between said upper and lower members for achieving separation thereof; and removing the resultant molded plastic toilet seat bed plate from one of said mold members.

* * * * *